(12) United States Patent
Inose et al.

(10) Patent No.: US 10,774,958 B2
(45) Date of Patent: Sep. 15, 2020

(54) THREADED JOINT FOR STEEL PIPE

(71) Applicants: Nippon Steel & Sumitomo Metal Corporation, Tokyo (JP); Vallourec Oil and Gas France, Aulnoye-Aymeries (FR)

(72) Inventors: Keita Inose, Tokyo (JP); Masaaki Sugino, Tokyo (JP); Fumio Ota, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 6 days.

(21) Appl. No.: 16/072,014

(22) PCT Filed: Jan. 25, 2016

(86) PCT No.: PCT/JP2016/000341
§ 371 (c)(1),
(2) Date: Jul. 23, 2018

(87) PCT Pub. No.: WO2017/130234
PCT Pub. Date: Aug. 3, 2017

(65) Prior Publication Data
US 2019/0032820 A1  Jan. 31, 2019

(51) Int. Cl.
*F16L 15/04* (2006.01)
*E21B 17/08* (2006.01)
(Continued)

(52) U.S. Cl.
CPC .......... *F16L 15/04* (2013.01); *E21B 17/0423* (2013.01); *E21B 17/08* (2013.01);
(Continued)

(58) Field of Classification Search
None
See application file for complete search history.

(56) References Cited

U.S. PATENT DOCUMENTS

| 4,373,754 A | 2/1983 | Bollfrass et al. |
| 5,415,442 A * | 5/1995 | Klementich ........ E21B 17/0423 285/331 |

(Continued)

FOREIGN PATENT DOCUMENTS

| JP | S62-196486 A | 8/1987 |
| JP | 2705505 B2 | 1/1998 |

(Continued)

OTHER PUBLICATIONS

Translation of International Search Report issued from corresponding PCT/JP2016/000341, dated Apr. 5, 2016.

*Primary Examiner* — Zachary T Dragicevich
*Assistant Examiner* — Douglas S Wood
(74) *Attorney, Agent, or Firm* — Banner & Witcoff, Ltd.

(57) ABSTRACT

A pin includes, in order from a free end thereof, a shoulder surface, a first sealing surface, a first male threaded portion, a second sealing surface, and a second male threaded portion. A box includes a shoulder surface, a first sealing surface, a first female threaded portion, a second sealing surface, and a second female threaded portion. The flank angles of load flanks of the first male threaded portion and the first female threaded portion are each less than 0 degrees. The first male threaded portion is composed of, in order from near the second sealing surface, an incomplete thread section and a complete thread section. The incomplete thread section has a length of at least three times the thread pitch thereof and has a thread height lower than the thread height of the complete thread section. The incomplete thread section is provided with clearances between crests and roots.

6 Claims, 2 Drawing Sheets

(51) Int. Cl.
 F16L 15/06 (2006.01)
 E21B 17/042 (2006.01)
 F16L 15/00 (2006.01)

(52) U.S. Cl.
 CPC .......... F16L 15/002 (2013.01); F16L 15/004 (2013.01); F16L 15/06 (2013.01)

(56) References Cited

U.S. PATENT DOCUMENTS

2017/0167641 A1* 6/2017 Daly .................. E21B 17/0423
2019/0330930 A1* 10/2019 Oku ...................... E21B 17/042

FOREIGN PATENT DOCUMENTS

| JP | 2002-295747 A | 10/2002 |
| JP | 2005-351324 A | 12/2005 |
| JP | 2007-205361 A | 8/2007 |
| JP | 2013-536339 A | 9/2013 |
| JP | 2015-534614 A | 12/2015 |
| WO | 01/029476 A1 | 4/2001 |

* cited by examiner

THREADED JOINT FOR STEEL PIPE

RELATED APPLICATIONS

This application is a National Stage Application under 35 U.S.C. 371 of co-pending PCT application PCT/JP2016/000341 designating the United States and filed Jan. 25, 2016 which is hereby incorporated by reference in its entirety.

TECHNICAL FIELD

The present invention relates to a threaded joint for use in connecting steel pipes or tubes (hereinafter also referred to as "steel pipes").

BACKGROUND ART

In oil wells, natural gas wells, and the like (hereinafter also collectively referred to as "oil wells"), steel pipes referred to as oil country tubular goods (OCTG) such as casings and tubings are used for extraction of underground resources. The steel pipes are sequentially connected to each other, and threaded joints are used for the connection.

Threaded joints for steel pipes are classified into two types: coupling-type joints and integral-type joints. A coupling-type threaded joint is constituted by a pair of tubular goods that are to be connected to each other, of which one is a steel pipe and the other is a coupling. In this case, the steel pipe includes male threaded portions formed on the outer peripheries at both ends thereof, and the coupling includes female threaded portions formed on the inner peripheries at both ends thereof. Then, the steel pipe and the coupling are connected to each other. An integral-type threaded joint is constituted by a pair of steel pipes as tubular goods that are to be connected to each other, without a separate coupling being used. In this case, each steel pipe includes a male threaded portion formed on the outer periphery at one end thereof and a female threaded portion formed on the inner periphery at the other end thereof. Then, the one steel pipe and the other steel pipe are connected to each other.

In general, the joint portion at the tubular end where a male threaded portion is disposed is referred to as a pin because it includes an element that is inserted into a female threaded portion. On the other hand, the joint portion at the tubular end where a female threaded portion is disposed is referred to as a box because it includes an element that receives a male threaded portion. Pins and boxes both have a tubular shape because they are constituted by end portions of tubular goods.

In recent years, oil wells have increasingly become deep-underground or ultra-deep-water wells and accordingly oil well environments have become harsh with high temperatures, high pressures, and high corrosivity. To deal with such harsh environments, heavy wall steel pipes are widely used as oil country tubular goods. A threaded joint for connecting such steel pipes is required to provide excellent sealing performance against pressure from the internal thereof (hereinafter also referred to as "internal pressure") and pressure from the external thereof (hereinafter also referred to as "external pressure").

The following is a conventional technique for the improvement of sealing performance for threaded joints of heavy wall steel pipes. International Publication No. WO01/029476 (Patent Literature 1) discloses a threaded joint having two surface-to-surface seal portions. In the technique of Patent Literature 1, a pin includes, in order from a free end of the pin toward a tubular body, a shoulder surface, a first sealing surface, a first male threaded portion, a second sealing surface, and a second male threaded portion. A box includes a shoulder surface, a first sealing surface, a first female threaded portion, a second sealing surface, and a second female threaded portion, which correspond to the above portions of the pin, respectively. A first threaded portion constructed of the first male threaded portion and the first female threaded portion is a tapered threaded portion with a trapezoidal thread. The same is true for a second threaded portion constructed of the second male threaded portion and the second female threaded portion.

The first threaded portion and the second threaded portion engage in intimate contact with each other in a fastened state and have an interference fit. Both the first sealing surfaces and the second sealing surfaces are respectively brought into contact with each other by the screwing of the pin, and in a fastened state, they engage in intimate contact with each other and have an interference fit. Both the shoulder surfaces are brought into contact with each other by the screwing of the pin, and serve as stopper for restricting the screwing of the pin. The shoulder surfaces serve as a stopper, and in a fastened state, serve to impart so-called thread tightening axial force to the load flanks of the respective pins of the first threaded portion and the second threaded portion.

In the case of the first threaded portion and the second threaded portion disclosed in Patent Literature 1, in a fastened state, both the load flanks of the pin and the box are in contact with each other, the root of the pin and the crest of the box are in contact with each other, and further, the crest of the pin and the root of the box are in contact with each other.

With a threaded joint of Patent Literature 1 having this configuration, a firm threaded connection is ensured because of the engagement and intimate contact between the first threaded portion and the second threaded portion. In addition to this, by the engagement and intimate contact between the first sealing surfaces, a surface-to-surface seal portion closer to the internal is formed, and a sealing performance against internal pressure is mainly ensured. In addition, by the engagement and intimate contact between the second sealing surfaces, a surface-to-surface seal portion closer to the external is formed, and a sealing performance against external pressure is mainly ensured.

CITATION LIST

Patent Literature

Patent Literature 1: International Publication No. WO01/029476

SUMMARY OF INVENTION

Technical Problem

Threaded joints for use in harsh environments of recent years, particularly threaded joints for heavy wall steel pipes are required to exhibit further improved sealing performance against internal and external pressures.

An object of the present invention is to provide a threaded joint for steel pipes having the following characteristics:

Improved sealing performance against external pressure with the sealing performance against internal pressure being maintained.

Solution to Problem

A threaded joint for steel pipe in one embodiment of the present invention is a threaded joint including: a tubular pin, a tubular box, the pin and the box being fastened by screwing the pin onto the box.

The pin includes: in order from the free end thereof, a shoulder surface; a first sealing surface; a tapered first male threaded portion; a second sealing surface; and a tapered second male threaded portion.

The box includes: in order from the closest to the tubular body toward the free end thereof, a shoulder surface; a first sealing surface; a tapered first female threaded portion; a second sealing surface; and a tapered second female threaded portion.

The first male threaded portion includes: crests; roots; stabbing flanks; and load flanks.

The first female threaded portion includes: roots facing the crests of the first male threaded portion; crests facing the roots of the first male threaded portion; stabbing flanks facing the stabbing flanks of the first male threaded portion; and load flanks facing the load flanks of the first male threaded portion.

The load flanks of the first male threaded portion and the first female threaded portion each have a flank angle of less than 0 degrees.

The first male threaded portion is composed of, in order from near the second sealing surface, an incomplete thread section and a complete thread section.

The incomplete thread section has a length along the pipe axis, the length being at least three times a thread pitch of the first male threaded portion, and the incomplete thread section has a thread height lower than a thread height of the complete thread section.

In a fastened state, in the complete thread section: the crests of the first male threaded portion are in contact with the roots of the first female threaded portion; the load flanks of the first male threaded portion are in contact with the load flanks of the first female threaded portion; clearances are provided between the roots of the first male threaded portion and the crests of the first female threaded portion; and clearances are provided between the stabbing flanks of the first male threaded portion and the stabbing flanks of the first female threaded portion, and in the incomplete thread section: clearances are provided between the crests of the first male threaded portion and the roots of the first female threaded portion.

In the above threaded joint, the length of the incomplete thread section along the pipe axis is preferably at most eight times the thread pitch of the first male threaded portion.

In the above threaded joint, the pin preferably includes, between the first male threaded portion and the second sealing surface, an annular portion that is not in contact with the box in a fastened state. In the case of the threaded joint, the length of the annular portion along the pipe axis is preferably at most three times the thread pitch of the first male threaded portion.

In the above threaded joint, clearances between the roots of the first male threaded portion and the crests of the first female threaded portion are preferably 0.05 mm or more.

In the above threaded joint, the following configuration is preferably employed.

The second male threaded portion includes crests, roots, stabbing flanks, and load flanks.

The second female threaded portion includes roots facing the crests of the second male threaded portion, crests facing the roots of the second male threaded portion, stabbing flanks facing the stabbing flanks of the second male threaded portion, and load flanks facing the load flanks of the second male threaded portion.

The flank angle of the load flanks of each of the second male threaded portion and the second female threaded portion is less than 0 degrees.

In a fastened state, the roots of the second male threaded portion and the crests of the second female threaded portion are in contact with each other, and the load flanks of the second male threaded portion and the load flanks of the second female threaded portion are in contact with each other, clearances are provided between the crests of the second male threaded portion and the roots of the second female threaded portion, and clearances are provided between the stabbing flanks of the second male threaded portion and the stabbing flanks of the second female threaded portion.

Advantageous Effects of Invention

A threaded joint for steel pipes of the present invention has the following significant advantages:

Ability to exhibit improved sealing performance against external pressure while the sealing performance against internal pressure is maintained.

DESCRIPTION OF EMBODIMENTS

Figure 1:
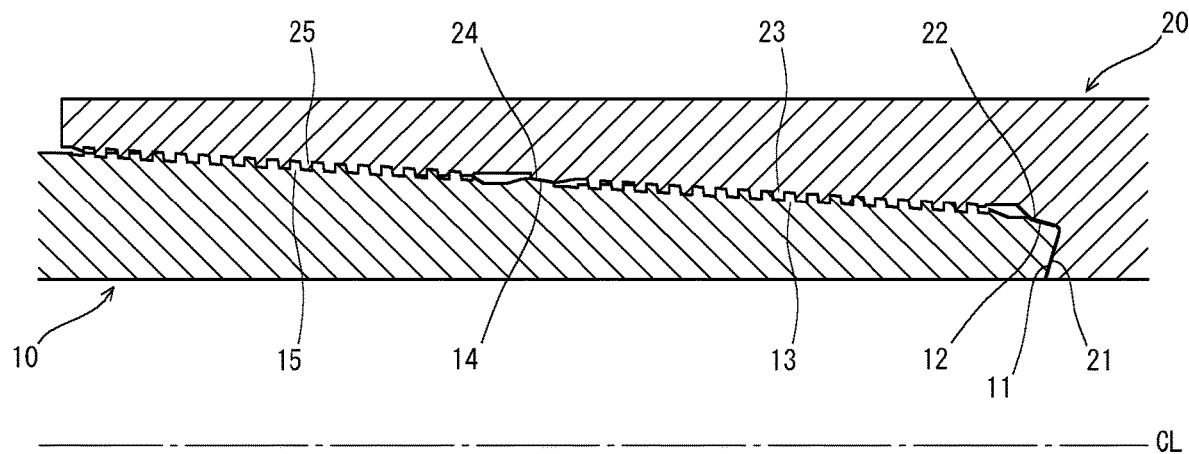
FIG. 1 is a longitudinal sectional view of a threaded joint for steel pipes according to a first embodiment.

In order to achieve the above object, the present inventors turned their attention to a threaded joint having two surface-to-surface seal portions, and they conducted intense research for a configuration that allows each seal portion to provide the sealing performance to the fullest extent. A main configuration of the threaded joint is as follows. The pin is provided with a shoulder surface at its free end. The threaded portion is divided into two portions: a first threaded portion closer to the internal (hereinafter, also referred to as "inner threaded portion") and a second threaded portion closer to the external (hereinafter, also referred to as "outer threaded portion"), and the first threaded portion and the second threaded portion are both tapered threaded portions with trapezoidal threads. Between the shoulder surface and the first threaded portion, a surface-to-surface first seal portion between the first sealing surfaces (hereinafter, also referred to as "internal seal portion") is provided. Between the first threaded portion and the second threaded portion, a surface-to-surface second seal portion between the second sealing surfaces (hereinafter, also referred to as "intermediate seal portion") is provided. The internal seal portion mainly contributes a sealing performance against internal pressure. The intermediate seal portion mainly contributes a sealing performance against external pressure. As a result of the research, the present inventors first discovered the following findings.

As a technique for improving sealing performance against external pressure, the following techniques are conceivable. A first technique is to increasing an engage margin (interference margin) in an intermediate seal portion. This is due to the fact that contact interfacial pressure between the sealing surfaces is increased in the intermediate seal portion.

With the first technique, at the time of insertion of a pin into a box, it is necessary to avoid the first male threaded portion of the pin and the second sealing surface of the box being brought into contact, and avoid the second sealing surface of the pin and the second female threaded portion of the box being brought into contact. For this reason, the dimensions of the pin and the box have to be designed such that a maximum diameter of the second sealing surface of the pin is smaller than a minimum diameter of the second female threaded portion of the box, and a minimum diameter of the second sealing surface of the box is larger than a maximum diameter of the first male threaded portion of the pin. A method for increasing an interference margin in the intermediate seal portion is to make thread tapers of the first threaded portion and the second threaded portion steep. Another method is to provide an incomplete thread having a thread height lower than a complete thread, in a region near the intermediate seal portion out of the regions in the first male threaded portion of the pin and the second female threaded portion of the box.

However, if the thread tapers are made too steep, the area of the shoulder surface provided at the free end of the pin is reduced, and resistance to compressive forces is decreased. Furthermore, in this case, a length of engagement of the threaded portion is shortened, increasing the risk of the occurrence of jump-out (the phenomenon in which a pin inadvertently becomes disengaged from a box). On the basis of these problems, there is a limit on making the thread tapers steep. In addition, in the first technique, when the interference margin is excessively increased, there is the risk of the occurrence of galling at the time of screwing the pin onto the box. For this reason, there is a limit on increasing the interference margin.

A second technique is to increase a wall thickness in the regions of an intermediate seal portion of a pin. The reason for this is as follows. With the application of external pressure to a threaded joint, the pin is deformed inward radially, causing the contact between the sealing surfaces of the intermediate seal portion to become relieved. In this regard, the increase in the wall thickness of the pin increases a resistance against radial contraction. However, an inner diameter of a pin is specified by the standards of API (American Petroleum Institute), and the enlargement of the outer diameter of the pin is limited due to structural restriction of an oil well. For this reason, there is a limit to increasing the wall thickness in the regions in the intermediate seal portion of the pin.

Therefore, with only the above first and second techniques, there is a limit to the improvement of sealing performance against external pressure.

Thus, the present inventors thought that if it is possible to subject regions in an intermediate seal portion of a box to radial contraction when a high external pressure is applied to a threaded joint, contact interfacial pressure between sealing surfaces of an intermediate seal portion can be amplified. As a result of intense research, they the present inventors found that the following configuration is effective.

Of an inner threaded portion (first threaded portion) and an outer threaded portion (second threaded portion) that sandwich an intermediate seal portion (second seal portion), in the inner threaded portion, of a male threaded portion of a pin and a female threaded portion of a box that engage each other, the thread height of the male threaded portion of the pin is reduced in a region near the intermediate seal portion.

With this configuration, the engagement and intimate contact of the thread is relieved at an incomplete thread section having a low thread height. This causes, in the box, the incomplete thread section of the inner threaded portion and the regions of the intermediate seal portion adjacent to the incomplete thread section to be subject to radial contraction when a high external pressure is applied to the threaded joint. As a result, contact interfacial pressure between sealing surfaces is amplified in the intermediate seal portion, leading to the improvement of sealing performance against external pressure.

However, the following point should be paid attention to. First, if the flank angle of load flanks of the inner threaded portion is a positive angle that is greater than 0 degrees, although the box is to be subjected to radial contraction with the application of external pressure, reaction force is applied from load flanks of the pin (male threaded portion), and thus the radial contraction of the box is interfered with. Therefore, to allow the radial contraction of the box, the flank angle of the load flanks of the inner threaded portion is a negative angle that is less than 0 degrees.

Furthermore, in the case where an inner threaded portion in which roots of a pin and crests of a box are in contact with each other in a fastened state, like the threaded joint in above Patent Literature 1, is employed, even if the thread height of the pin (male threaded portion) is reduced in regions near an intermediate seal portion, the contact state of the root of the pins and the crests of the box is maintained in the incomplete thread section. For this reason, the radial contraction of the box with the application of external pressure is interfered with. In addition, in the threaded joint in above Patent Literature 1, when the thread height of a first female threaded portion of the box is reduced in regions near the intermediate seal portion, the contact area between load flanks is reduced. As a result, when tensile load and compressive load are applied to the threaded joint, stress acting on the inner threaded portion becomes relatively high, leading to the risk of plastic deformation of the inner threaded portion. Moreover, there is the risk of the occurrence of jump-out. Therefore, to allow the radial contraction of the box, an inner threaded portion in which crests of a pin and roots of a box are in contact with each other is employed.

A threaded joint for steel pipe according to the present invention is completed based on the above findings. Hereinafter, embodiments of a threaded joint for steel pipe according to the present invention will be described.

First Embodiment

Figure 2:
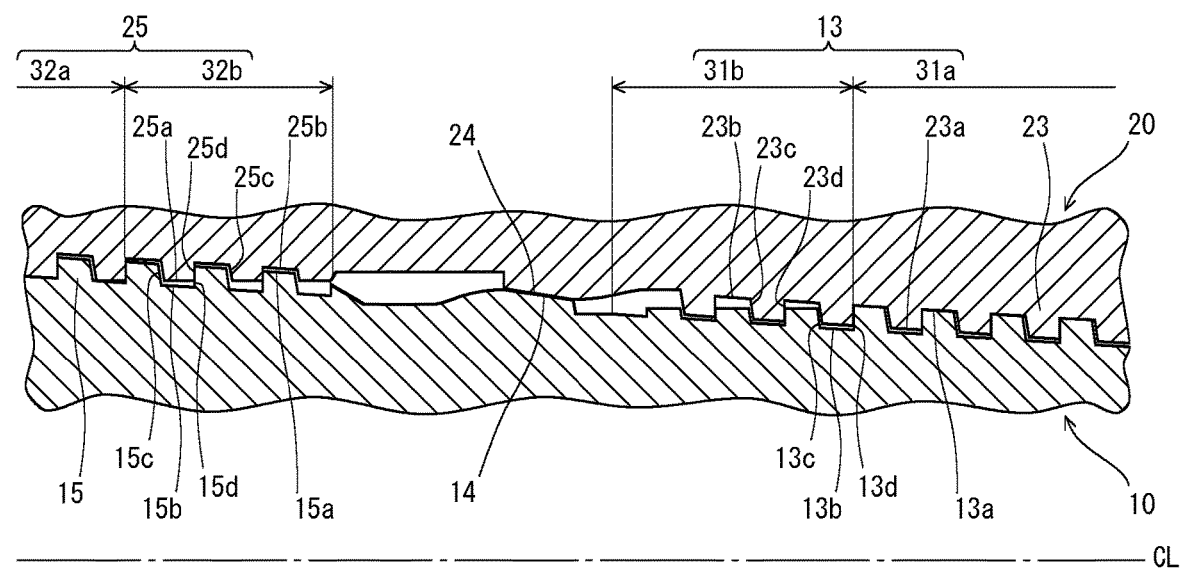
FIG. 2 is an enlarged longitudinal sectional view of the threaded joint for steel pipe shown in FIG. 1, showing a region near its second seal portion.

FIG. 1 is a longitudinal sectional view of a threaded joint for steel pipe according to a first embodiment. FIG. 2 is an enlarged longitudinal sectional view of the threaded joint for steel pipe, showing a region near its second seal portion. As shown in FIG. 1 and FIG. 2, a threaded joint of the present embodiment is a coupling-type threaded joint and composed of a pin 10 and a box 20.

The pin 10 includes, in order from a free end of the pin 10 toward a tubular body, a shoulder surface 11, a first sealing surface 12, a first male threaded portion 13, a second sealing surface 14, and a second male threaded portion 15. The first sealing surface 12 and the second sealing surface 14 are both tapered surface. To be exact, the first sealing surface 12 and the second sealing surface 14 are each a surface constituted by the peripheral surface of a truncated cone having a diameter decreasing toward the free end of the pin 10, or a surface constituted by a combination of the peripheral surface of the truncated cone and the peripheral surface of a solid of revolution that is obtained by rotating a curved line such as an arc about a pipe axis CL.

The shoulder surface 11 is an annular surface substantially perpendicular to the pipe axis CL. To be exact, the shoulder surface 11 is an annular surface inclining from a plane perpendicular to the pipe axis CL in a screwing direction of the pin 10, and inclining toward the free end of the pin 10 as extending to the outer periphery thereof.

In contrast, the box 20 includes, in order from the closest to the tubular body toward the free end, of the box 20, a shoulder surface 21, a first sealing surface 22, a first female threaded portion 23, a second sealing surface 24, and a second female threaded portion 25. The shoulder surface 21, the first sealing surface 22, the first female threaded portion 23, the second sealing surface 24, and the second female threaded portion 25 of the box 20 are located so as to correspond to the shoulder surface 11, the first sealing surface 12, the first male threaded portion 13, the second sealing surface 14, and the second male threaded portion 15 of the pin 10.

The first male threaded portion 13 of the pin 10 and the first female threaded portion 23 of the box 20 are tapered threaded portions with trapezoidal threads that engage with each other, and constitute a first threaded portion closer to the internal (an inner threaded portion). The second male threaded portion 15 of the pin 10 and the second female threaded portion 25 of the box 20 are also tapered threaded portions with trapezoidal threads that engage with each other, and constitute a second threaded portion closer to the external (an outer threaded portion). In the case of the threaded joint in the first embodiment, the tapered surface of the first threaded portion and the tapered surface of the second threaded portion match with each other because the second sealing surfaces 14 and 24 are simply added between the first threaded portion and the second threaded portion.

As shown in FIG. 2, as to the inner threaded portion, the first male threaded portion 13 of the pin 10 includes crests 13a, roots 13b, stabbing flanks 13c, and load flanks 13d, the stabbing flanks 13c being in a leading position in screwing, and the load flanks 13d being located opposite from the stabbing flanks 13c. In contrast, the first female threaded portion 23 of the box 20 includes crests 23a facing the roots 13b of the first male threaded portion 13, roots 23b facing the crests 13a of the first male threaded portion 13, stabbing flanks 23c facing the stabbing flanks 13c of the first male threaded portion 13, and load flanks 23d facing the load flanks 13d of the first male threaded portion 13.

As to the outer threaded portion, the second male threaded portion 15 of the pin 10 includes crests 15a, roots 15b, stabbing flanks 15c, and load flanks 15d, the stabbing flanks 15c being in a leading position in screwing, and the load flanks 15d being located opposite from the stabbing flanks 15c. In contrast, the second female threaded portion 25 of the box 20 includes crests 25a facing the roots 15b of the second male threaded portion 15, roots 25b facing the crests 15a of the second male threaded portion 15, stabbing flanks 25c facing the stabbing flanks 15c of the second male threaded portion 15, and load flanks 25d facing the load flanks 15d of the second male threaded portion 15.

Tapered threads of the first threaded portion in the present embodiment are buttress tapered threads, and the flank angle of each of the load flanks 13d and 23d is a negative angle that is less than 0 degrees. The flank angle as referred to herein is an angle formed by a plane perpendicular to the pipe axis CL and the flank, and herein, clockwise angles are designated as positive angles (see FIG. 2). The same is true for tapered threads of the second threaded portion.

It is to be noted that, as to the inner threaded portion, the first male threaded portion 13 of the pin 10 is composed of, in order from near the second sealing surface 14, an incomplete thread section 31b and a complete thread section 31a. The incomplete thread section 31b has a length along the pipe axis CL, the length being at least three times the thread pitch of the first male threaded portion 13. Furthermore, in the first male threaded portion 13, the incomplete thread section 31b has a thread height lower than a thread height of the complete thread section 31a. The roots 13b in the incomplete thread section 31b of the first male threaded portion 13 and the roots 13b in the complete thread section 31a are flush with a single tapered surface. The crests 13a in the incomplete thread section 31b of the first male threaded portion 13, starting from a boundary between the complete thread section 31a and the incomplete thread section 31b, are flush with a cylindrical periphery that is parallel to the pipe axis CL.

As to the outer threaded portion, the second female threaded portion 25 of the box 20 is composed of, in order from near the second sealing surface 24, an incomplete thread section 32b and a complete thread section 32a. The length of the incomplete thread section 32b along the pipe axis CL is practically about three to eight times the thread pitch of the second female threaded portion 25, although the length does not particularly matter. Furthermore, in the incomplete thread section 32b, the thread height of the second female threaded portion 25 is lower than the thread height of the complete thread section 32a. The roots 25b in the incomplete thread section 32b of the second female threaded portion 25 and the roots 25b in the complete thread section 32a are flush with a single tapered surface.

The roots 13b of the first male threaded portion 13 are on the extended taper surfaces of the roots 15b of the second male threaded portion 15.

The first male threaded portion 13 and the first female threaded portion 23 (inner threaded portion), and the second male threaded portion 15 and the second female threaded portion 25 (outer threaded portion) are threadedly engageable with each other, respectively, and in a fastened state, engage in intimate contact with each other and have an interference fit. The first sealing surfaces 12 and 22, and the second sealing surfaces 14 and 24 are brought into contact with each other by the screwing of the pin 10, respectively, and in a fastened state, engage in intimate contact with each other and have an interference fit, so as to form a first seal portion (internal seal portion) and a second seal portion (intermediate seal portion) by surface-to-surface contact. The shoulder surfaces 11 and 21 are brought into contact and pressed against each other by the screwing of the pin 10, and in a fastened state, impart tightening axial force to the load flanks 13d and 15d of the pin 10.

As to the inner threaded portion in a fastened state, both the complete thread section 31a and the incomplete thread section 31b are brought into the following state. The load flanks 13d of the first male threaded portion 13 and the load flanks 23d of the first female threaded portion 23 are in contact with each other. Clearances are provided between the roots 13b of the first male threaded portion 13 and the crests 23a of the first female threaded portion 23. Clearances are provided between the stabbing flanks 13c of the first male threaded portion 13 and the stabbing flanks 23c of the first female threaded portion 23. However, in the complete thread section 31a, the crests 13a of the first male threaded portion 13 and the roots 23b of the first female threaded portion 23 are in contact with each other. In contrast, in the incomplete thread section 31b near the second sealing surfaces 14 and 24 (intermediate seal portion), clearances are provided between the crests 13a of the first male threaded portion 13 and the roots 23b of the first female threaded portion 23, so as to relieve the engagement and intimate contact of the first threaded portion.

As to the outer threaded portion in a fastened state, both the complete thread section 32a and the incomplete thread section 32b are brought into the following state. The load flanks 15d of the second male threaded portion 15 and the load flanks 25d of the second female threaded portion 25 are in contact with each other. Clearances are provided between the crests 15a of the second male threaded portion 15 and roots 25b of the second female threaded portion 25. Clearances are provided between the stabbing flanks 15c of the second male threaded portion 15 and the stabbing flanks 25c of the second female threaded portion 25. However, in the complete thread section 32a, the roots 15b of the second male threaded portion 15 and the crests 25a of the second female threaded portion 25 are in contact with each other. In contrast, in the incomplete thread section 32b near the second sealing surfaces 14 and 24 (intermediate seal portion), clearances are provided between the roots 15b of the second male threaded portion 15 and the crests 25a of the second female threaded portion 25, so as to relieve the engagement and intimate contact of the second threaded portion.

Optionally, as to the outer threaded portion in a fastened state, on the contrary to the above embodiment, both in the complete thread section 32a and the incomplete thread section 32b, the crests 15a of the second male threaded portion 15 and the roots 25b of the second female threaded portion 25 may be in contact with each other. In this case, the roots 15b of the second male threaded portion 15 and the crest 25a of the second female threaded portion 25 are not in contact each other both in the complete thread section 32a and the incomplete thread section 32b, and clearances are provided therebetween.

With the threaded joint in the first embodiment having this configuration, the flank angle of the load flanks 13d and 23d in the first threaded portion (inner threaded portion) is less than 0 degrees. In the incomplete thread section 31b in the first threaded portion, the engagement and intimate contact in the first threaded portion is relieved. As a result, when a high external pressure is applied to the threaded joint, in the box 20, the incomplete thread section 31b of the first threaded portion and the regions of the second sealing surfaces 24 that are the intermediate seal portion adjacent to the incomplete thread section 31b are subjected to radial contraction. As a result, contact interfacial pressure between the second sealing surfaces 14 and 24 is amplified, improving sealing performance against external pressure.

Sealing performance against internal pressure is maintained by surface-to-surface contact between the first sealing surfaces 12 and 22 being the internal seal portion.

It is to be noted that, in the incomplete thread section 31b in the first threaded portion, only the load flanks 13d and 23d are contact regions between the first male threaded portion 13 and the first female threaded portion 23. In this case, a fastened state may become unstable because, at first glance, the total engagement area of the first threaded portion is reduced. However, in reality, since the second threaded portion is disposed outside the first threaded portion, the fastened state is stabilized by the engagement of the second threaded portion.

The following are additional descriptions of preferred embodiments of main parts.

In the incomplete thread section 31b and the complete thread section 31a of the first threaded portion, the clearances are set between the roots 13b of the first male threaded portion 13 and the crests 23a of the first female threaded portion 23, so as to ensure that the radial contraction of the box 20 is not interfered with when external pressure is applied. For example, the clearances are preferably 0.05 mm or more. The upper limit of the clearances is not particularly specified, but if the clearances are too large, the reduction of the total engagement area in the first threaded portion becomes significant. As a result, when tensile load and compressive load are applied to the threaded joint, stress acting on the first threaded portion becomes relatively high, leading to the risk of plastic deformation of the first threaded portion. Moreover, there is the risk of the occurrence of the phenomenon in which the pin 10 inadvertently becomes disengaged from the box 20 (jump-out). Therefore, in view of practicability, the upper limit of the clearances is preferably set to about 0.25 mm.

If the length of the incomplete thread section 31b in the first threaded portion is too short, the box 20 is not efficiently subjected to radial contraction at the time of the application of external pressure. Therefore, the lower limit of the length of the incomplete thread section 31b is three times the thread pitch of the first male threaded portion 13. A more preferred lower limit of the length of the incomplete thread section 31b is four times the thread pitch of the first male threaded portion 13.

In contrast, if the length of the incomplete thread section 31b in the first threaded portion is too long, the following disadvantage arises. The improvement effects of sealing performance with the radial contraction of the box 20 due to the application of the external pressure are saturated. In addition, the reduction of the total engagement area in the first threaded portion becomes significant. This leads to plastic deformation of the first threaded portion or the occurrence of jump-out when tensile load and compressive load is applied to the threaded joint. Therefore, it is preferable that the upper limit of the length of the incomplete thread section 31b is eight times the thread pitch of the first male threaded portion 13. A more preferred upper limit of the length of the incomplete thread section 31b is seven times of the thread pitch of the first male threaded portion 13.

The lower limit of the flank angle of the load flanks 13d and 23d in the first threaded portion (inner threaded portion) is not particularly specified. This is because if the flank angle of the load flanks 13d and 23d is a negative angle that is less than 0 degrees, the radial contraction of the box 20 is not interfered with at the time of the application of external pressure. However, the lower limit of the flank angle of the load flanks 13d and 23d, in view of the ease of thread machining, is preferably set to −15 degrees. A more preferred lower limit of the flank angle is −10 degrees.

Second Embodiment

Figure 3:
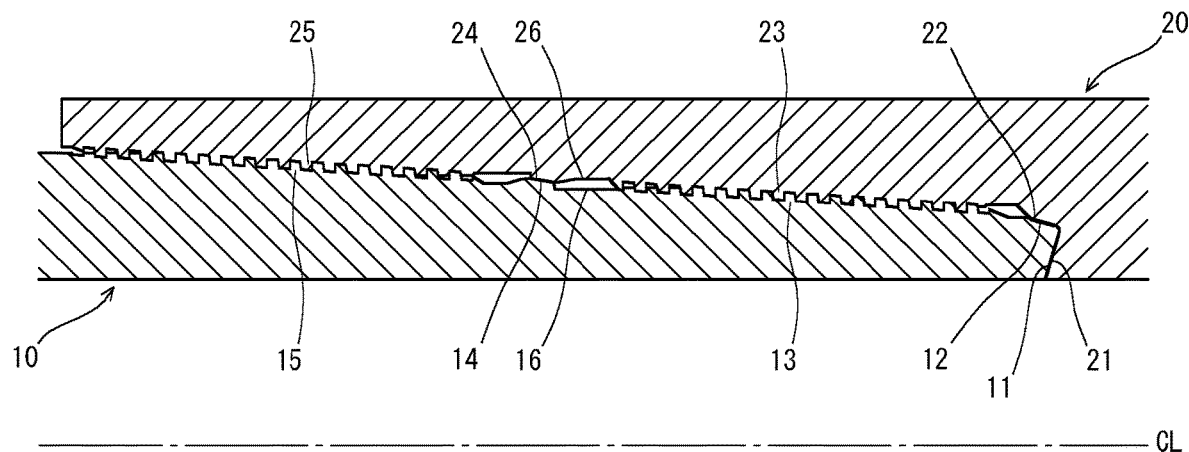
FIG. 3 is a longitudinal sectional view of a threaded joint for steel pipe according to a second embodiment.
Figure 4:
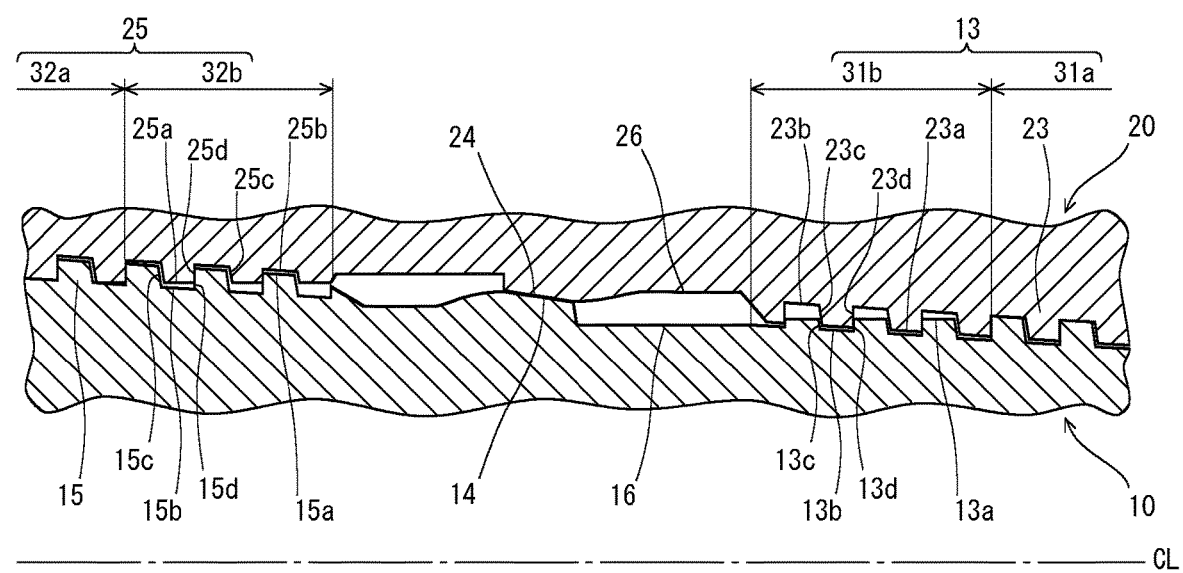
FIG. 4 is a longitudinal sectional view of the threaded joint for steel pipe shown in FIG. 3, showing a region near its second seal portion.

FIG. 3 is a longitudinal sectional view of a threaded joint for steel pipe according to a second embodiment of the present invention. FIG. 4 is an enlarged longitudinal sectional view of the threaded joint for steel pipe, showing a region near its second seal portion. The threaded joint in the second embodiment shown in FIG. 3 and FIG. 4 is a variation of the threaded joint according to the first embodiment shown in the FIG. 1 and FIG. 2, and therefore descriptions redundant to those given in the first embodiment will not be repeated where appropriate.

As shown in FIG. 3 and FIG. 4, a pin 10 includes, between a first male threaded portion 13 and a second sealing surface 14, an annular portion 16. In contrast, a box 20 is provided with an annular groove between a first female threaded portion 23 and a second sealing surface 24 and includes an annular portion 26 that is formed by providing the annular groove. The annular portion 26 of the box 20 is provided corresponding to the annular portion 16 of the pin 10, and in a fastened state, is not in contact with the annular portion 16 of the pin 10. That is, in a fastened state, a clearance is provided between the annular portion 16 of the pin 10 and the annular portion 26 of the box 20. Because surplus lubricant (hereinafter, also referred to as dope) that has been applied at the time of thread fastening can be received in the clearance, it is possible to avoid contact pressure between the second sealing surfaces 14 and 24 inadvertently being reduced due to increase of the pressure of the dope.

It is to be noted that if the length of the annular portion 16 of the pin 10 along the pipe axis CL is too long, the following disadvantage arises. In the case where the total length of the threaded joint is standardized, the total lengths of the first threaded portion and the second threaded portion are substantially shortened. As a result, when tensile load and compressive load are applied to the threaded joint, stress acting on the first threaded portion and the second threaded portion becomes relatively high, leading to the risk of plastic deformation of the first threaded portion and the second threaded portion. Moreover, there is the risk of the occurrence of jump-out. Therefore, the length of the annular portion 16 is preferably at most three times the thread pitch of the first male threaded portion 13.

The threaded joint according to the second embodiment also produces advantageous effects similar to those of the first embodiment described above.

The present invention is not limited to the embodiments described above, and various modifications may be made without departing from the spirit and scope of the present invention. For example, in the embodiments described above, the crests 13a in the incomplete thread section 31b of the first male threaded portion 13 are flush with a cylindrical surface parallel to the pipe axis CL, but may be flush with a tapered surface that inclines toward the pipe axis CL. In addition, in the embodiments described above, the roots 13b of the first male threaded portion 13 are flush with the extended taper surface of the roots 15b of the second male threaded portion 15, but may be located between the extended surface and a tapered surface having an outer diameter smaller than the extended surface by twice the thread height of the second male threaded portion 15.

The threaded joints of the embodiments described above may be employed either as an integral-type threaded joint or as a coupling-type threaded joint.

EXAMPLE

To verify the advantages of the present invention, numerical simulation and analysis was carried out using the elasto-plastic finite element method.

<Test Conditions>

In the FEM analysis, models of coupling-type threaded joint for oil country tubular goods were prepared. For the models, the flank angle of the load flanks of the first threaded portion, the formation locations and the clearance dimensions of clearances in the first threaded portion, the formation locations of clearances in the second threaded portion, the length of the incomplete thread section in the first threaded portion, and the length of the annular portion are varied.

The common conditions were as follows.

Steel pipe size: 10⅛ [inch]×0.8 [inch] (outer diameter of 257.2 mm and wall thickness of 20.3 mm), Coupling outer diameter: 276.6 mm Grade of steel pipe and coupling: API standard Q125 (carbon steel having a yield stress of 125 [ksi])

Thread form (first threaded portion and second threaded portion): taper of 1/10, thread height (complete thread section) of 1.575 [mm], thread pitch of 5.08 [mm], stabbing flank angle of 10 degrees, and stabbing flank clearance of 0.15 [mm].

In the FEM analysis, the material in use were an isotropic hardening elasto-plastic, the material being modeled so as to have a modulus of elasticity of 210 [GPa], and a nominal yield strength, expressed as 0.2% proof stress, of 125 [ksi] (=862 [MPa]). The tightening was carried out to the point where the shoulder surfaces of the pin and the box were brought into contact with each other, and further continued up to a point of 1.5/100 turns.

The varied conditions are shown in Table 1 below.

TABLE 1

| | | Clearance in complete thread section | | | | Length of | Length of | Seal contact force (Ration to #1) | | | |
| | | 1st threaded portion | | 2nd threaded portion | | | | | | | |
| | Load | (Inner threaded portion) | | (Outer threaded portion) | | Annular | incomplete | | | | |
| No. | flank angle [°] | Location (ref. to pin) | Clearance [mm] | Location (ref. to pin) | Clearance [mm] | Portion [mm] | thread section [mm] | 2nd seal (Intermediate seal) | 1st seal (Inner seal) | Evaluation | Classification |
|---|---|---|---|---|---|---|---|---|---|---|---|
| #1 | −3 | Crest * | 0.20 | Crest | 0.20 | 0.00 | 0.00 * | 1.00 | 1.00 | X | Comp. Ex. |
| #2 | −3 | Root | 0.20 | Crest | 0.20 | 0.00 | 33.05 | 1.14 | 1.05 | ○ | Inv. Ex. |
| #3 | −3 | Crest * | 0.20 | Crest | 0.20 | 14.05 | 0.00 * | 0.97 | 0.96 | X | Comp. Ex. |
| #4 | 3 * | Root | 0.20 | Crest | 0.20 | 14.05 | 19.00 | 0.89 | 0.89 | X | Comp. Ex. |
| #5 | −3 | Root | 0.20 | Crest | 0.20 | 14.05 | 19.00 | 1.17 | 1.02 | ◉ | Inv. Ex. |
| #6 | −3 | Root | 0.10 | Crest | 0.20 | 14.05 | 19.00 | 1.13 | 1.07 | ○ | Inv. Ex. |
| #7 | −3 | Root | 0.05 | Crest | 0.20 | 14.05 | 19.00 | 1.15 | 1.08 | ◉ | Inv. Ex. |
| #8 | −3 | Root | 0.20 | Root | 0.20 | 14.05 | 19.00 | 1.06 | 1.05 | Δ | Inv. Ex. |
| #9 | −3 | Root | 0.20 | Crest | 0.20 | 14.05 | 13.36 | 1.19 | 1.03 | ◉ | Inv. Ex. |
| #10 | −3 | Root | 0.20 | Crest | 0.20 | 14.05 | 22.85 | 1.10 | 1.00 | ○ | Inv. Ex. |
| #11 | −3 | Crest * | 0.20 | Crest | 0.20 | 33.05 | 0.00 * | 1.12 | 0.58 | X | Comp. Ex. |

Remarks) The symbol "*" indicates that the value is outside the range specified by the present invention.

Models of Test Nos. 1, 3, 4, and 11 are comparative examples that do not satisfy the conditions specified by the present invention. Among them, models of Test Nos. 1, 3, and 11 are each provided with clearances between crests of a male threaded portion (pin) and roots of a female threaded portion (box) in a complete thread section of a first threaded portion, and have no incomplete thread section. Model of Test No. 4 has a flank angle of the load flank of 3 degrees being a positive angle. On the other hand, models of Test Nos. 2 and 5 to 10 are inventive examples that satisfy the conditions specified by the present invention. Among them, models of Test No. 2 were prepared based on the threaded joint in the first embodiment as shown in FIG. 1 and FIG. 2. Models of Test Nos. 5 to 10 were prepared based on the threaded joint in the second embodiment shown in FIG. 3 and FIG. 4.

<Evaluation Method>

In the FEM analysis, a load sequence which simulated that in an ISO 13679: 2011 Series A test was sequentially applied to each model in a fastened state. The sealing performance against external pressure was evaluated by comparing the minimum values of the seal contact force [N/mm], i.e., "average contact pressure between the sealing surfaces"בcontact width", of the second seal portion (intermediate seal portion) under the load. It is noted that the higher the value of the contact force, the better the sealing performance of the seal portion. Likewise, the sealing performance against internal pressure of the first seal portion (internal seal portion) was evaluated by comparing the seal contact forces. The evaluations of sealing performance were made in the following manner: provided that the sealing performance against internal pressure and the sealing performance against external pressure of the model of Test No. 1 were each represented by the value 1, evaluations of the remaining models were made by determining values relative to the values of Test No. 1 as indices.

The evaluations of sealing performance were made using the following four levels.

◉: Excellent. A sealing performance of an intermediate seal portion against external pressure of 1.15 or more, and a sealing performance of the internal seal portion against internal pressure of 1.0 or more.

○: Good. A sealing performance of an intermediate seal portion against external pressure of 1.10 or more, and a sealing performance of the internal seal portion against internal pressure of 1.0 or more.

Δ: Acceptable. A sealing performance of an intermediate seal portion against external pressure of 1.05 or more, and a sealing performance of the internal seal portion against internal pressure of 1.0 or more.

x: Poor. A sealing performance of an intermediate seal portion against external pressure of less than 1.05, or a sealing performance of the internal seal portion against internal pressure of less than 1.0.

<Test Results>

The test results are shown in Table 1 above.

The models of test Nos. 1 and 3, which are comparative examples, had short lengths of incomplete thread sections of first threaded portions, radial contraction of boxes were therefore restricted, and thus there was no improvement in their sealing performances against external pressure.

The model of test No. 4, which is a comparative example, had a positive load flank angle of a first threaded portion, radial contraction of a box was restricted, and thus there was no improvement in its sealing performance against external pressure.

The model of test No. 11, which is a comparative example, had a short length of an incomplete thread section of a first threaded portion but exhibited an improved sealing performance against external pressure. This is because radial contraction of a box was substantially allowed due to the provision of a long annular portion. However, the total engagement area in the first threaded portion was significantly decreased due to the provision of the long annular portion, and thus a sealing performance against internal pressure was decreased.

The models of test Nos. 2 and 5 to 10, which are inventive examples, had sufficiently long incomplete thread sections of first threaded portions, allowing boxes to be efficiently subjected to radial contraction, and thus exhibited improved sealing performances against external pressure and maintained sealing performances against internal pressure. Among them, the models of test Nos. 5, 7, and 9 had lengths of incomplete thread sections that fall within the range from four times to seven times the thread pitches of male threaded portions, and exhibited remarkable improved sealing performances against external pressure.

It is to be noted that the model of test No. 8, which is an inventive example, had a low substantial interference margin of an intermediate seal portion because interference of a second threaded portion (outer threaded portion) reaches near an intermediate seal portion, and thus the degree of the improvement of sealing performance against external pressure was relatively small.

The results described above demonstrate that the employment of a threaded joint for steel pipes according to the present invention allows improved sealing performance against external pressure while maintaining sealing performance against internal pressure.

INDUSTRIAL APPLICABILITY

A threaded joint according to the present invention is capable of being effectively utilized in the connection of heavy wall steel pipes that are used as oil country tubular goods in harsh environments.

REFERENCE SIGNS LIST

10: pin,
11: shoulder surface,
12: first sealing surface,
13: first male threaded portion,
13a: crest of first male threaded portion,
13b: root of first male threaded portion,
13c: stabbing flank of first male threaded portion,
13d: load flank of first male threaded portion,
14: second sealing surface,
15: second male threaded portion,
15a: crest of second male threaded portion,
15b: root of second male threaded portion,
15c: stabbing flank of second male threaded portion,
15d: load flank of second male threaded portion,
16: annular portion,
20: box,
21: shoulder surface,
22: first sealing surface,
23: first female threaded portion,
23a: crest of first female threaded portion,
23b: root of first female threaded portion,
23c: stabbing flank of first female threaded portion,
23d: load flank of first female threaded portion,
24: second sealing surface, 25: second female threaded portion,
25a: crest of second female threaded portion,
25b: root of second female threaded portion,
25c: stabbing flank of second female threaded portion,
25d: load flank of second female threaded portion,
26: annular portion,
31a: complete thread section of first threaded portion,
31b: incomplete thread section of first threaded portion,
32a: complete thread section of second threaded portion,
32b: incomplete thread section of second threaded portion,
CL: pipe axis

The invention claimed is:

1. A threaded joint for steel pipes, comprising: a tubular pin and a tubular box, the pin and the box being fastened by screwing the pin onto the box,
the pin comprising: in order from a free end thereof, a shoulder surface, the shoulder surface being an annular surface inclining from a plane perpendicular to a longitudinal axis of the pin in a screwing direction of the pin, inclining toward the free end of the pin, and extending to an outer periphery of the pin; a first sealing surface; a tapered first male threaded portion; a second sealing surface; and a tapered second male threaded portion,
the box comprising: in order from the closest to a tubular body toward a free end thereof, a shoulder surface; a first sealing surface; a tapered first female threaded portion; a second sealing surface; and a tapered second female threaded portion,
the first male threaded portion including: crests; roots; stabbing flanks; and load flanks,
the first female threaded portion including: roots facing the crests of the first male threaded portion; crests facing the roots of the first male threaded portion; stabbing flanks facing the stabbing flanks of the first male threaded portion; and load flanks facing the load flanks of the first male threaded portion,
the load flanks of the first male threaded portion and the first female threaded portion each having a flank angle of less than 0 degrees,
characterized in that,
the first male threaded portion is composed of, in order from near the second sealing surface, an incomplete thread section and a complete thread section,
the incomplete thread section has a length along the pipe axis, the length being at least three times a thread pitch of the first male threaded portion, and the incomplete thread section has a thread height lower than a thread height of the complete thread section, and
in a fastened state,
the shoulder surface of the pin and the shoulder surface of the box are in contact with and pressed against each other, and
in the complete thread section: the crests of the first male threaded portion are in contact with the roots of the first female threaded portion; the load flanks of the first male threaded portion are in contact with the load flanks of the first female threaded portion; clearances are provided between the roots of the first male threaded portion and the crests of the first female threaded portion; and clearances are provided between the stabbing flanks of the first male threaded portion and the stabbing flanks of the first female threaded portion, and in the incomplete thread section: clearances are provided between the crests of the first male threaded portion and the roots of the first female threaded portion.

2. The threaded joint for steel pipes according to claim 1, characterized in that:
the length of the incomplete thread section along the pipe axis is at most eight times the thread pitch of the first male threaded portion.

3. The threaded joint for steel pipes according to claim 1, characterized in that:
the pin includes, between the first male threaded portion and the second sealing surface, an annular portion that is not in contact with the box in a fastened state.

4. The threaded joint for steel pipes according to claim 3, characterized in that:
a length of the annular portion along the pipe axis is at most three times the thread pitch of the first male threaded portion.

5. The threaded joint for steel pipes according to claim 1, characterized in that:
clearances between the roots of the first male threaded portion and the crests of the first female threaded portion are 0.05 mm or more.

6. The threaded joint for steel pipes according to claim 1, characterized in that:
the second male threaded portion includes crests, roots, stabbing flanks, and load flanks,
the second female threaded portion includes roots facing the crests of the second male threaded portion, crests facing the roots of the second male threaded portion, stabbing flanks facing the stabbing flanks of the second male threaded portion, and load flanks facing the load flanks of the second male threaded portion,
a flank angle of the load flanks of each of the second male threaded portion and the second female threaded portion is less than 0 degrees, and
in a fastened state, the roots of the second male threaded portion and the crests of the second female threaded portion are in contact with each other, and the load flanks of the second male threaded portion and the load flanks of the second female threaded portion are in contact with each other, clearances are provided between the crests of the second male threaded portion and the roots of the second female threaded portion, and clearances are provided between the stabbing flanks of the second male threaded portion and the stabbing flanks of the second female threaded portion.

* * * * *